US012785467B2

(12) United States Patent
Sangha et al.

(10) Patent No.: US 12,785,467 B2
(45) Date of Patent: Nov. 3, 2026

(54) STATOR ASSEMBLY

(71) Applicant: Hamilton Sundstrand Corporation, Charlotte, NC (US)

(72) Inventors: Parminder Sangha, Dorridge (GB); Savvas Georgiou, Enfield (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 234 days.

(21) Appl. No.: 18/661,966

(22) Filed: May 13, 2024

(65) Prior Publication Data

US 2024/0388147 A1 Nov. 21, 2024

(30) Foreign Application Priority Data

May 17, 2023 (EP) .................................... 23173998

(51) Int. Cl.
*H02K 1/18* (2006.01)

(52) U.S. Cl.
CPC .................................... *H02K 1/185* (2013.01)

(58) Field of Classification Search
CPC ............ H02K 1/185; H02K 1/16; H02K 5/04; H02K 1/02; H02K 2201/15
USPC .................................................. 310/216.113
See application file for complete search history.

(56) References Cited

U.S. PATENT DOCUMENTS

| | | | | | |
|---|---|---|---|---|---|
| 4,134,036 | A | | 1/1979 | Curtiss | |
| 4,894,574 | A | | 1/1990 | Ragaly | |
| 5,525,852 | A | * | 6/1996 | Fanning | H02K 44/06 310/216.061 |
| 5,936,324 | A | * | 8/1999 | Montagu | H02K 1/2726 310/156.11 |
| 9,444,293 | B2 | | 9/2016 | Yoshinori et al. | |
| 9,653,961 | B2 | | 5/2017 | Silva | |
| 10,075,041 | B2 | | 9/2018 | Claycomb et al. | |
| 10,476,322 | B2 | | 11/2019 | Zhong et al. | |
| 10,804,766 | B1 | | 10/2020 | Siddiqui et al. | |
| 11,211,849 | B2 | | 12/2021 | Banham | |
| 2002/0135244 | A1 | | 9/2002 | Strong et al. | |
| 2005/0006970 | A1 | | 1/2005 | Klingenberg et al. | |
| 2005/0017597 | A1 | | 1/2005 | Mays | |
| 2009/0015093 | A1 | * | 1/2009 | Reutter | H02K 1/187 310/216.118 |
| 2013/0020902 | A1 | * | 1/2013 | Sato | H02K 1/185 310/216.118 |

(Continued)

OTHER PUBLICATIONS

European Search Report for Application No. 23173998.8, mailed Oct. 19, 2024, 11 pages.

*Primary Examiner* — Ahmed Elnakib
(74) *Attorney, Agent, or Firm* — CANTOR COLBURN LLP

(57) ABSTRACT

A stator assembly for an electric motor. The stator assembly includes a stator core pack and a sleeve for the stator core pack. The sleeve includes a first portion proximal to a first end of the sleeve and a second portion adjacent to the first portion of the sleeve. The stator core pack is at least partially within the sleeve and the first portion of the sleeve is in contact with the stator core pack. The sleeve is arranged to apply a compressive stress to the stator core pack and the stator assembly is arranged such that the compressive stress applied by the first portion of the sleeve to the stator core pack is greater than the compressive stress applied by the second portion of the sleeve to the stator core pack.

18 Claims, 4 Drawing Sheets

(56) References Cited

U.S. PATENT DOCUMENTS

| | | | | |
|---|---|---|---|---|
| 2014/0035430 | A1* | 2/2014 | Bang | H02K 1/04 310/216.113 |
| 2014/0319936 | A1 | 10/2014 | Makino et al. | |
| 2020/0083764 | A1 | 3/2020 | Tran et al. | |

* cited by examiner

STATOR ASSEMBLY

CROSS REFERENCE TO RELATED APPLICATIONS

This application claims priority to European Patent Application No. 23173998.8 filed May 17, 2023, the entire contents of which is incorporated herein by reference.

TECHNICAL FIELD

This disclosure relates to stator assemblies for electric motors.

BACKGROUND

In operation, electric motors may experience high torques. For example, in some applications torques in the region of 800 Nm are experienced. Therefore, the mechanical integrity of the electric motor may be important.

It is possible to shrink-fit a stator core pack into a motor housing during assembly of an electric motor. However, while this process may result in good mechanical integrity of the stator core pack within the motor housing, this process may also result in large compressive stresses along the length of the stator core pack.

The process of shrink-fitting is also a relatively complex process, in some examples it requires heating of the outer component and cooling of the inner component before assembly. Reducing shrink-fitting may enable simplification of the assembly process. Shrink-fit components are also particularly hard to disassemble, and therefore alternate assembly methods may improve ease of disassembly of the electric motor.

Some materials have a lower flux-density capability under compressive stress, and therefore this may reduce the flux-density capability of the stator core pack. For a required flux-density capability of the stator core, this may result in a larger, and therefore heavier, stator core. Therefore, this may result in a larger, and therefore heavier, electric motor.

Cobalt iron alloys have higher flux density capability than other materials that may be used in stator core packs, such as silicon iron lamination materials. However, the flux density capability of cobalt iron alloys is particularly sensitive to compressive stress. Therefore, in many applications where there are high compressive stresses on the stator core pack, it is not viable to use cobalt iron alloys. This may result in the use of lower flux density capable materials, which are less stress sensitive, and therefore a larger and/or heavier stator core pack may be required.

Reduced size and/or weight may be particularly advantageous in certain applications for electric motors, such as automotive and aerospace applications.

It may also be important to have a low resistance heat path between the stator core and the housing. An interference fit may provide such a low resistance heat path. However, alternative approaches to assembly of the stator core pack with the motor housing may not provide a low resistance heat path.

Additionally, at high temperatures the motor housing may expand more than the stator core pack. This may result in the stator core pack being able to move relative to the motor housing, for example rotationally or axially.

SUMMARY

The present disclosure provides a stator assembly for an electric motor, the stator assembly comprising: a stator core pack; and a sleeve for the stator core pack; wherein the sleeve comprises: a first portion proximal to a first end of the sleeve; and a second portion adjacent to the first portion of the sleeve; wherein the stator core pack is at least partially within the sleeve; wherein the first portion of the sleeve is in contact with the stator core pack; wherein the sleeve is arranged to apply a compressive stress to the stator core pack; and wherein the stator assembly is arranged such that the compressive stress applied by the first portion of the sleeve to the stator core pack is greater than the compressive stress applied by the second portion of the sleeve to the stator core pack.

A central longitudinal axis of the stator assembly (and thus the stator core pack and the sleeve) may be defined as the axis along which the stator assembly, the stator core pack and/or the sleeve extend, e.g. about which they are substantially rotationally symmetrical, e.g. about which they are arranged substantially coaxially with each other. Thus, the stator assembly, the stator core pack and/or the sleeve extend may be substantially cylindrical.

The second portion of the sleeve and the first portion of the sleeve may be arranged to be adjacent to each other in an axial direction of the sleeve (i.e. in a direction parallel to the central longitudinal axis).

The stator core pack may be arranged to be at least partially within the sleeve in a radial direction of the sleeve (i.e. in a direction perpendicular to the central longitudinal axis and extending outwards from the central longitudinal axis).

The (e.g. first portion and/or second portion of the) sleeve may be arranged to apply the compressive stress to the stator core pack in a radial direction of the sleeve.

In some examples, at least part of the second portion of the sleeve is (e.g. radially) spaced from (not in contact with) the stator core pack.

In some examples, the second portion of the sleeve is in contact with the stator core pack.

In some examples, the sleeve comprises a third portion proximal to a second end of the sleeve. The third portion of the sleeve and the second portion of the sleeve may be arranged to be adjacent to each other in an axial direction of the sleeve (i.e. in a direction parallel to the central longitudinal axis).

The second portion may be between the first portion and the third portion. Thus, the first portion of the sleeve, the second portion of the sleeve and the third portion of the sleeve may be arranged at respective axial positions of the sleeve, e.g. the first portion of the sleeve, the second portion of the sleeve and the third portion of the sleeve form respective axial portions of the sleeve.

The third portion of the sleeve may be in contact with the stator core pack. The stator assembly may be arranged such that the compressive stress applied by the third portion of the sleeve to the stator core pack is greater than the compressive stress applied by the second portion of the sleeve to the stator core pack.

The first end of the sleeve and the second end of the sleeve may be at axially opposite ends of the sleeve.

In some examples, at least part of an inner surface of the second portion of the sleeve is radially outward of (e.g. an inner surface of) the first portion of the sleeve.

The sleeve may be an annular sleeve, e.g. comprising an (e.g. substantially cylindrical) inner surface and an (e.g. substantially cylindrical) outer surface, wherein the outer surface is radially outward of the inner surface.

In some examples, the sleeve comprises an end protrusion. The end protrusion may extend radially inwardly from an inner surface of the sleeve. The end protrusion may be proximal to the first end of the sleeve. The end protrusion may be arranged to at least partially retain the stator core pack (e.g. axially) relative to the sleeve.

In some examples, the stator assembly comprises a retention ring. The retention ring may be proximal to a second end of the sleeve. The retention ring may be arranged to least partially retain the stator core pack (e.g. axially) relative to the sleeve.

The retention ring may be arranged radially within the sleeve.

The retention ring may comprise a circlip.

In some examples, the sleeve comprises a retention ring groove. The retention ring groove may be proximal to the second end of the sleeve. The retention ring groove may extend at least partially around a circumference of an inner surface of the sleeve. The retention ring may be located in the retention ring groove.

The retention ring groove may extend radially outwardly from an inner surface of the sleeve.

In some examples, the sleeve comprises at least one anti-rotation groove. The anti-rotation groove may extend axially from an end of the sleeve. The stator core pack may comprise at least one anti-rotation protrusion. The at least one anti-rotation protrusion may be located in the at least one anti-rotation groove, e.g. to prevent the sleeve rotating (e.g. azimuthally) relative to the stator core pack.

The anti-rotation groove of the sleeve may extend radially outwardly from an inner surface of the sleeve.

The anti-rotation protrusion of the stator core pack may extend radially outwardly from an outer surface of the stator core pack.

In some examples, the stator core pack comprises at least one anti-rotation groove. The anti-rotation groove may extend axially from an end of the stator core pack. The sleeve may comprise at least one anti-rotation protrusion. The at least one anti-rotation protrusion may be located in the at least one anti-rotation groove, e.g. to prevent the sleeve rotating (e.g. azimuthally) relative to the stator core pack.

The anti-rotation groove of the stator core pack may extend radially inwardly from an outer surface of the stator core pack.

The anti-rotation protrusion of the sleeve may extend radially inwardly from an inner surface of the sleeve.

In some examples, the stator core pack comprises (e.g. is formed from, e.g. consists of) a cobalt iron alloy.

In some examples, the stator core pack is a laminated stator core pack. The laminated stator core pack may comprise a plurality of lamination layers.

In some examples, the stator core pack comprises a plurality of stator core pack pieces. Each stator core pack piece may form an azimuthal segment of the stator core pack.

The present disclosure also provides an electric motor comprising: a stator assembly as described herein; and a motor housing; wherein the stator assembly is retained within the motor housing.

The stator assembly may be retained (e.g. radially, axially and/or azimuthally) within the motor housing.

In some examples, at least a portion of the motor housing is (e.g. radially) spaced from the stator assembly.

In some examples, the electric motor comprises a first tolerance ring. The sleeve may comprise a sleeve tolerance ring groove. The sleeve tolerance ring groove may be proximal to an end of the sleeve. The sleeve tolerance ring groove may extend at least partially around a circumference of an outer surface of the sleeve. The first tolerance ring may be located in the sleeve tolerance ring groove.

The sleeve tolerance ring groove may extend radially inwardly from an outer surface of the sleeve.

The first tolerance ring may be arranged radially outwardly adjacent to the outer surface of the sleeve.

In some examples, the electric motor comprises a second tolerance ring. The motor housing may comprise a motor housing tolerance ring groove. The motor housing tolerance ring groove may be proximal to an end of the sleeve. The motor housing tolerance ring groove may extend at least partially around a circumference of an inner surface of the motor housing. The second tolerance ring may be located in the motor housing tolerance ring groove.

The tolerance ring groove may extend radially outwardly from the inner surface of the motor housing.

The first tolerance ring may be arranged radially inwardly adjacent to the inner surface of the motor housing.

In some examples, the sleeve comprises at least one anti-rotation hole. The anti-rotation hole may extend radially inwardly from an outer surface of the sleeve. The electric motor may comprise at least one radial bolt located in the at least one anti-rotation hole (respectively). The at least one radial bolt may be arranged to (e.g. azimuthally) retain the stator assembly relative to the motor housing.

In some examples, the sleeve comprises at least one alignment groove. The alignment groove may extend axially from an end of the sleeve. One of the at least one anti-rotation holes may be located at the axial end of the alignment groove distal from the end of the sleeve from which the alignment groove extends.

The alignment groove may extend radially inwardly from the outer surface of the sleeve.

The present disclosure also provides a method of assembling a stator assembly, comprising: shrink fitting a sleeve onto a stator core pack to form a stator assembly; wherein the sleeve comprises: a first portion proximal to a first end of the sleeve; and a second portion adjacent to the first portion of the sleeve; wherein the stator core pack is at least partially within the sleeve; wherein the first portion of the sleeve is in contact with the stator core pack; wherein shrink fitting the sleeve onto the stator core pack is arranged to apply a compressive stress to the stator core pack; and wherein the stator assembly is arranged such that the compressive stress applied by the first portion of the sleeve to the stator core pack is greater than the compressive stress applied by the second portion of the sleeve to the stator core pack.

Shrink-fitting may comprise heating of the outer sleeve and/or cooling of the stator core pack prior to assembly.

The stator assembly being assembled may be the stator assembly as described herein. The features described herein relating to the stator assembly may therefore apply equally to the method.

The present disclosure also provides a method of assembling an electric motor, comprising: assembly a stator assembly as described herein; and assembling the stator assembly into a motor housing.

The electric motor being assembled may be the electric motor as described herein. The features described herein relating to the electric motor may therefore apply equally to the method.

In some examples, the method comprises fitting a retention ring.

In some examples, the sleeve comprises a retention ring groove. The step of fitting the retention ring may comprise locating the retention ring within a retention ring groove of the sleeve.

In some examples, the step of shrink-fitting the sleeve onto the stator core pack comprises locating an anti-rotation protrusion of the stator core pack within an anti-rotation groove of the sleeve.

In some examples, the step of shrink-fitting the sleeve onto the stator core pack comprises locating an anti-rotation protrusion of the sleeve within an anti-rotation groove of the stator core pack.

In some examples, the step of assembling the electric motor comprises assembling the stator core pack from a plurality of lamination layers.

In some examples, the step of assembling the electric motor comprises assembling the stator core pack from a plurality of stator core pack pieces; wherein each stator core pack piece forms an azimuthal segment of the stator core pack.

In some examples, the step of assembling the electric motor comprises fitting a first tolerance ring. The step of fitting the first tolerance ring may comprise locating the first tolerance ring in a sleeve tolerance ring groove.

In some examples, the step of assembling the electric motor comprises fitting a second tolerance ring. The step of fitting the second tolerance ring may comprise locating the second tolerance ring in a motor housing tolerance ring groove.

In some examples, the step of assembling the electric motor comprises fitting at least one radial bolt. The step of fitting the at least one radial bolt may comprise locating the at least one radial bolt in at least one anti-rotation hole (respectively) to (e.g. azimuthally) retain the stator assembly relative to the motor housing.

In some examples, the step of fitting the at least one radial bolt comprises locating the at least one radial bolt in at least one alignment groove.

BRIEF DESCRIPTION OF DRAWINGS

One or more non-limiting examples will now be described, by way of example only, and with reference to the accompanying figures in which.

DETAILED DESCRIPTION

Figure 1:
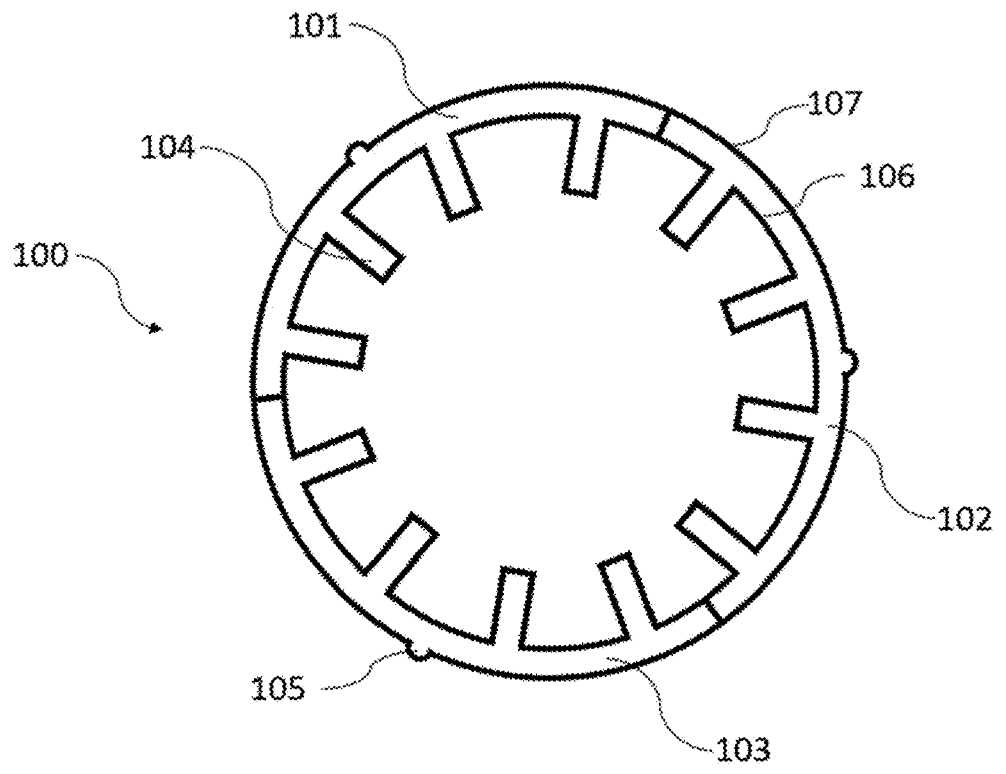
FIG. 1 shows a simplified lamination layer of a stator core pack for a stator assembly of an electric motor.

FIG. 1 shows a lamination layer 100 of a stator core pack for a stator assembly of an electric motor. The lamination layer 100 comprises three lamination layer pieces 101, 102, 103. The lamination layer 100 has an inner surface 106 and an outer surface 107. The lamination layer 100 comprises teeth protrusions 104, extending radially inwards from the inner surface 106. The lamination layer also comprises anti-rotation protrusions 105, extending radially outwards from the outer surface 107.

A stator core pack comprises a plurality of lamination layers 100 assembled concentrically on top of another, such that the stator core pack extends in the axial direction (i.e. along the central longitudinal axis of the stator core pack). Each lamination layer may be manufactured inexpensively, for example by punching each layer out of sheet metal.

In this example the lamination layer 100 is a three-piece lamination layer. This may enable use of smaller sheets of material in the manufacture of each lamination layer piece 101, 102, 103 than would otherwise be necessary to manufacture the lamination layer as a single piece.

Figure 2:
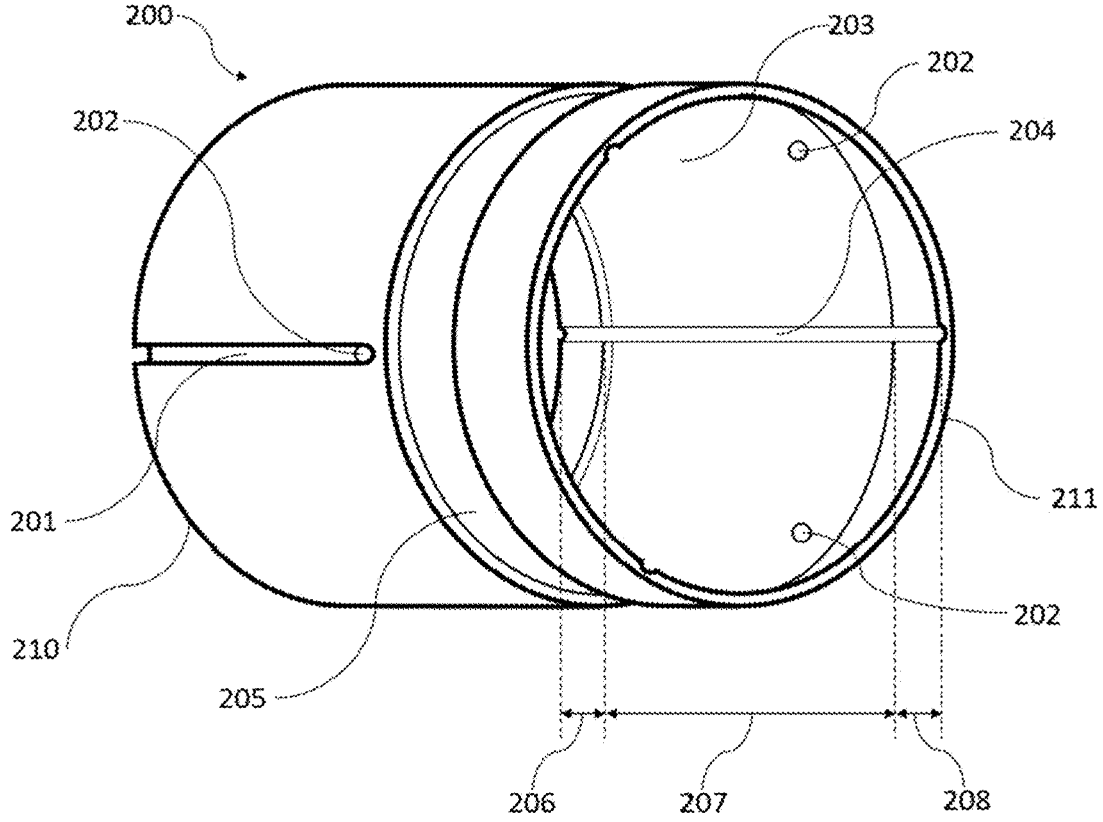
FIG. 2 shows schematically a sleeve for a stator core pack.

FIG. 2 shows a sleeve 200 for a stator core pack.

In this example, the sleeve comprises an alignment groove 201 on the outer surface of the sleeve 200 extending axially from a first end 210 of the sleeve 200. The sleeve 200 further comprises anti-rotation holes 202 extending radially inwards from the outer surface of the sleeve 200. In this example, one of the anti-rotation holes 202 is formed at the axial end of the alignment groove 201, furthest from the first end 210 of the sleeve 200. Two other anti-rotation holes 202 are located at the same axial position at different azimuthal positions of the sleeve 200. The anti-rotation holes 202 may extend through the thickness of the sleeve 200.

The first end 210 of the sleeve 200 may be inserted axially into a motor housing, through which a radial bolt may be inserted to engage with the alignment groove 201. This helps to align the anti-rotation holes 202 within the motor housing.

Additionally, the sleeve 200 comprises anti-rotation grooves 204 on its inner surface. In this example, the anti-rotation grooves 204 extend axially inwards on the inner surface of the sleeve 200 from a second end 211 of the sleeve 200. The anti-rotation grooves 204 correspond with the locations of the anti-rotation protrusions 105 of the lamination layers 100 of the stator core pack (as shown in FIG. 1). Therefore, the stator core pack may be axially inserted into the sleeve 200 at the second end 211. When assembled, the anti-rotation grooves 204 rotationally retain the stator core pack relative to the sleeve 200.

The sleeve 200 comprises a first portion 206, a second portion 207, and a third portion 208. The first portion 206 and third portion 208 are located proximal to the first end 210 and the second end 211 of the sleeve 200 respectively. The second portion 207 is located axially between the first portion 206 and the third portion 208. The outer surface of the sleeve 200 defines a sleeve tolerance ring groove 205 part-way along the axial length of the sleeve 200, which extends around the circumference of the sleeve 200.

The inner surface of the sleeve defines an inner step 203, which extends around the circumference of the sleeve 200. The axial length of the inner step 203 corresponds with the axial length of the second portion 207 of the sleeve 200.

Figure 3:
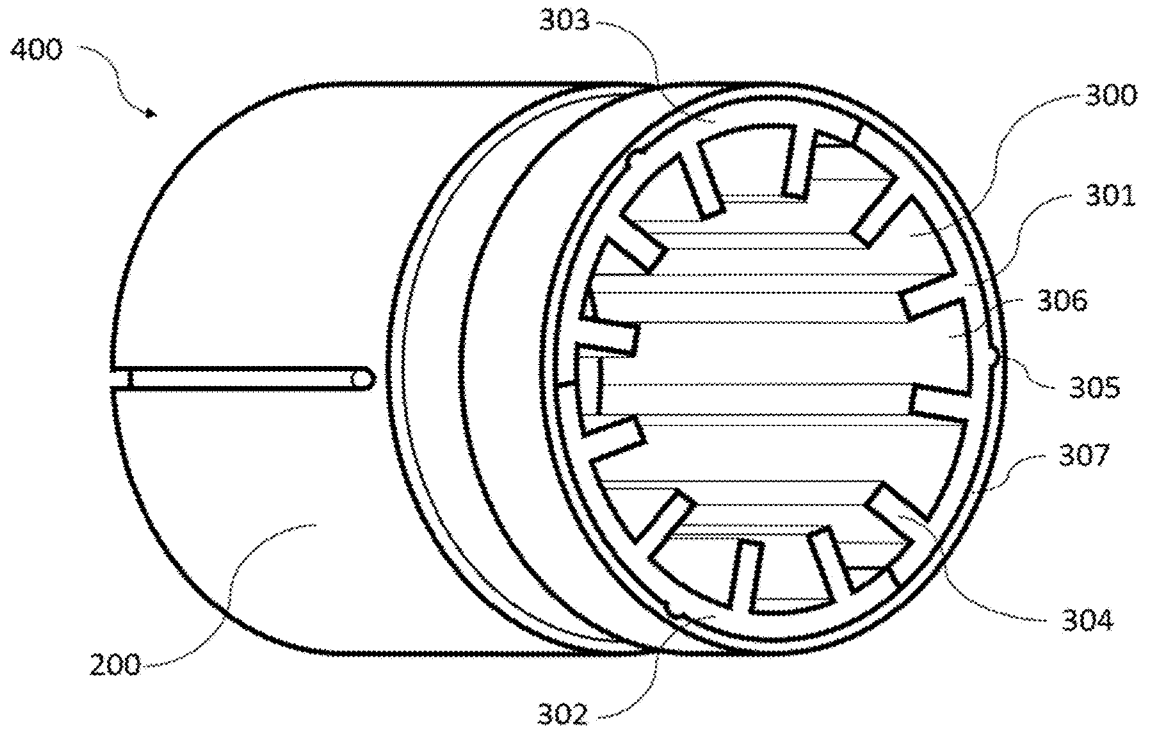
FIG. 3 shows schematically a stator assembly comprising a stator core pack and the sleeve of FIG. 2.

FIG. 3 shows a stator assembly 400 comprises the sleeve 200 of FIG. 2 and a stator core pack 300.

In this example, the stator core pack 300 comprises a plurality of the lamination layers 100 shown in FIG. 1. The stator core pack 300 has an inner surface 306 and an outer surface 307. In this example, the stator core pack 300 is a three-piece stator core pack, comprising three stator core pack pieces 301, 302, 303. Each stator core pack piece 301, 302, 303 corresponds with a lamination layer piece 101, 102, 103 of each lamination layer 100 (as shown in FIG. 1). The stator core pack 300 comprises teeth 304 for stator coil windings to be wound around, corresponding with the teeth protrusions 104 of each lamination layer 100. The stator core pack further comprises anti-rotation protrusions 305, corresponding with the anti-rotation protrusions 105 of the lamination layers 100.

The anti-rotation protrusions 305 are located in the anti-rotation grooves 204 of the sleeve 200 to rotationally retain the stator core pack 300 relative to the sleeve 200.

In this example, the sleeve 200 provides mechanical integrity to the three-piece stator core pack 300, retaining each of the three stator core pack pieces 301, 302, 303 in a fixed position.

Figure 4:
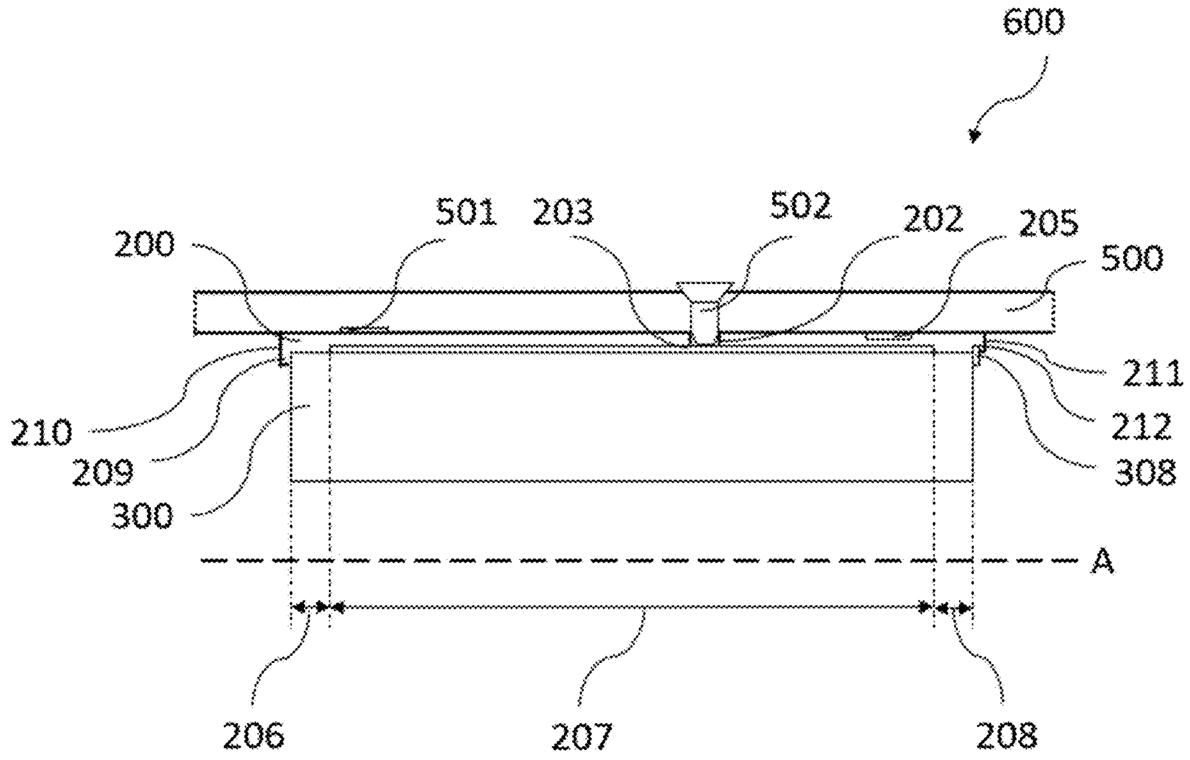
FIG. 4 shows schematically a partial cross-sectional view of an electric motor comprising the stator assembly of FIG. 3 and a motor housing.

FIG. 4 shows a partial cross-sectional view of an electric motor 600 comprising the stator assembly 400 shown in FIG. 3 and a motor housing 500. The central axis A of the stator assembly 400 is shown. However, for the purposes of clarity, not all of the components of the electric motor 600 (e.g. the rotor and the stator windings) are shown.

In FIG. 4, a retention ring 308 is shown, and a corresponding retention ring groove 212 for holding the retention ring 308 in the sleeve 200. Both the retention ring groove 212 and the retention ring 308 extend circumferentially around the inner surface of the sleeve 200, and are located proximal to the second end 211 of the sleeve 200.

FIG. 4 also shows an end protrusion 209 of the sleeve 200 which extends circumferentially around the inner surface of the sleeve 200, which in this example is at the first end 210 of the sleeve 200. These features, while not shown, may also be present on the sleeve 200 shown in FIGS. 2 and 3. In combination, the end protrusion 209 and the retention ring 308 axially retain the stator core pack 300, i.e. in the direction of axis A, relative to the sleeve 200.

FIG. 4 shows that the inner step 203 of the sleeve 200 results in a reduced shrink fit between the stator core pack 300 and the sleeve 200 along the second portion 207 around the circumference of the sleeve 200. This may reduce the compressive stress on the stator core pack 300. In some examples, there is a clearance between the stator core pack 300 and the sleeve 200 along the second portion 207, i.e. the sleeve 200 and stator core pack 300 are not in contact. In some examples, once the sleeve 200 has been shrink fitted onto the stator core pack 300, the sleeve 200 may be in contact with the stator core pack 300 along the second portion 207 but, owing to the reduced shrink fit, applies a lower compressive stress to the stator core pack 300 along the second portion 207.

Some materials have a lower flux-density capability when subjected to compressive stress, and therefore this may improve the flux-density capability of stator core pack 300. Improving the flux-density of the stator core may enable a smaller, and therefore lighter, stator core to be used. This may, therefore, also reduce the size and/or weight of the electric motor 600.

While in this example, there is an inner step 203 in the sleeve 200, in other examples there may be a step in the stator core pack 300 to result in the reduced shrink fit between the stator core pack 300 and the sleeve 200.

The reduced shrink fit is provided along the length of the second portion 207 of the stator core pack 300, between the stator core pack 300 and the sleeve 200. This may reduce compressive stress on the stator core pack 300. In this example, there is a larger radial interference fit around the circumference of the sleeve 200 between the stator core pack 300 and the sleeve 200 along the first portion 206 and the third portion 208 of the sleeve 200. This interference fit may improve the mechanical integrity of the assembly, and radially retain the stator core pack 300 within the sleeve 200.

Furthermore, in some examples, cooling is applied via the motor housing 500 and the sleeve 200 to the stator core pack 300. Therefore, it may be helpful to have a low resistance heat path between the stator core pack 300 and the housing 500, via the sleeve 200. An interference fit may provide such a low resistance heat path.

In this example, the first 206 and third 208 portions of the sleeve 200 together are approximately a fifth of the overall length of the sleeve 200.

While not clearly visible from FIG. 4, there is a radial clearance between the sleeve 200 and the motor housing 500. This may reduce compressive stress from the motor housing 500 on the sleeve 200, and thus may reduce compressive stress on the stator core pack 300.

Radial bolts 502 are located radially into the anti-rotation holes 202 of the sleeve 200 through corresponding holes in the motor housing 500, to axially and radially retain the sleeve 200 relative to the motor housing 500. During assembly, a radial bolt 502 may be partially inserted through a hole in the motor housing 500 to protrude into the alignment groove 201, as the sleeve 200 is inserted into the motor housing 500. This helps to prevent rotation of the sleeve 200 relative to the motor housing 500, while the sleeve 200 is inserted into the motor housing 500, and helps to align the anti-rotation holes 202 with the corresponding holes in the motor housing 500, before the radial bolts 502 are inserted into the anti-rotation holes 202.

In some examples, the radial bolt 502 may extend through the sleeve 200, into (e.g. a corresponding depression in) the stator core pack 300. However, in this example the lamination layers 100 of the stator core pack 300 may not be able to support the radial bolts 502 owing to their size.

In this example, a tolerance ring is located in and around the sleeve tolerance ring groove 205 of the sleeve 200. This provides an interference fit between the motor housing 500 and the sleeve 200. An interference fit may lead to better mechanical integrity of the electric motor 600, and a lower resistance heat path. The use of a tolerance ring to provide an interference fit between the sleeve 200 and the motor housing 500 may result in reduced compressive stress on the sleeve 200, and therefore the core pack 300, when compared with an interference fit directly between the sleeve 200 and the motor housing 500. A tolerance ring may also result in ease of assembly and disassembly when compared with an interference fit directly between the sleeve 200 and the motor housing 500.

In this example, a tolerance ring is also located within a motor housing tolerance ring groove 501 of the motor housing 500. The motor housing tolerance ring groove 501 extends circumferentially around an inner surface of the motor housing 500. This tolerance ring works in combination with the tolerance ring of the sleeve tolerance ring groove 205 of the sleeve 200 to help maintain the mechanical integrity and concentricity of the sleeve 200 within the motor housing 500.

In some examples, both tolerance rings may be located on either the motor housing 500 or the sleeve 200. However, in this example a tolerance ring is located in the motor housing tolerance ring groove 501 prior to assembly of the motor housing 500 with the sleeve 200. The sleeve 200 and the tolerance ring on the sleeve tolerance ring groove 205 of the sleeve 200 are then axially inserted into the motor housing 500. By providing a step for a tolerance ring in each of the motor housing 500 and the sleeve 200, assembly may be simplified.

Figure 5:
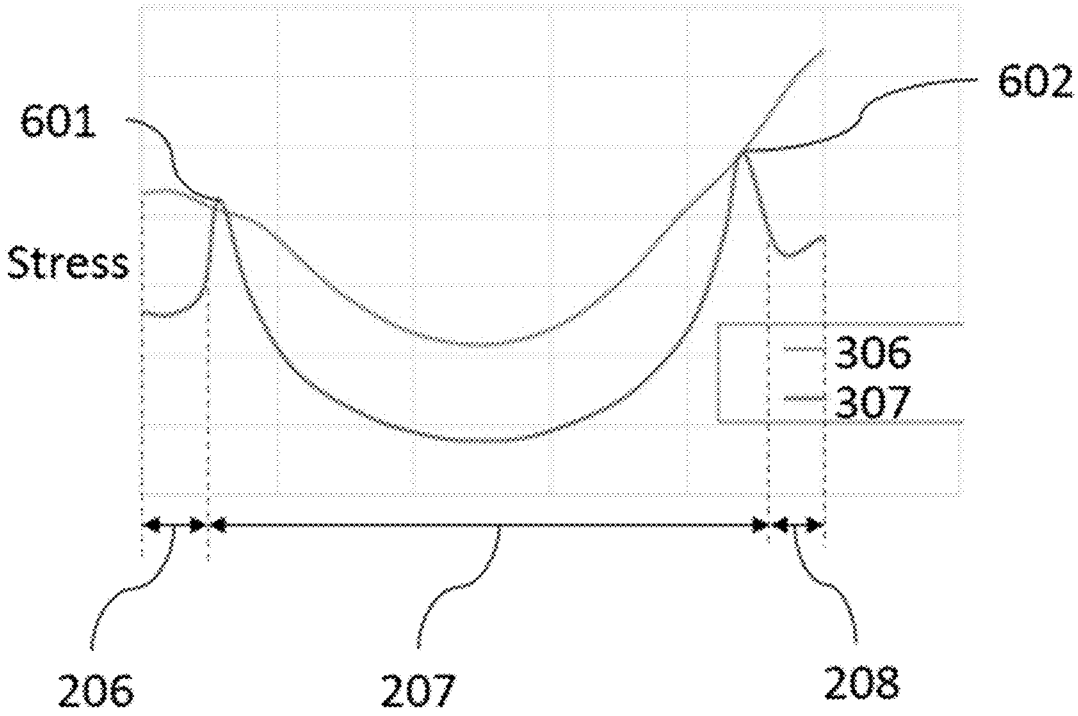
FIG. 5 shows a graph of stress variation of the core pack, of the electric motor of FIG. 4, over its length.

FIG. 5 shows a graph showing the variation of stress along the inner 306 and outer 307 surfaces of the stator core pack 300, of the electric motor 600 shown in FIG. 4.

As can be seen, stress on the stator core pack 300 corresponding with the second portion 207 of the sleeve 200 is reduced due to the reduced shrink fit between the stator core pack 300 and the sleeve 200. Along the first 206 and third 208 portions, stress is generally higher than along the second portion 207.

The positions of the tolerance rings, providing an interference fit between the sleeve 200 and the motor housing 500, correspond with the locations of peak stresses 601, 602 on the outer surface 307 of the core pack 300. However, these peak stresses 601, 602 may be higher if the tolerance rings were placed in a position that overlapped with the first 206 and/or third 208 portions of the sleeve 200. Therefore, as the positions of the tolerance rings in this example correspond with the second portion 207, the peak stresses 601, 602 are reduced.

In this example, the rotor, not shown, of the electric motor 600 is assembled inside of the stator core pack 300. In other words, this arrangement in this example is for an internal rotor and an external stator.

In this example, the sleeve 200 is a titanium sleeve. In this example, titanium has similar thermal expansion characteristics to the material of the stator core pack 300.

In this example, the sleeve thickness is approximately 7 mm.

In the examples in which the sleeve 200 is spaced from the stator core pack 300 along the second portion 207 of the sleeve 200, the clearance between the stator core pack 300 and the sleeve 200 is approximately 0.25 mm. This may provide sufficient clearance to reduce compressive stress, while also providing a reasonable heat path for cooling of the stator core pack via the sleeve 200. In some examples, the clearance between the sleeve 200 and the motor housing 500 is approximately 0.35 mm. This may provide sufficient clearance to reduce compressive stress, while also providing a reasonable heat path for cooling of the stator core pack via the sleeve 200 and the motor housing 500.

In this example, the tolerance rings are steel tolerance rings. Steel is relatively inexpensive, readily available and has suitable mechanical properties for use in this application.

In this example, the motor housing 500 is an aluminium motor housing. As aluminium has a relatively low weight, the weight of the electric motor 600 may be reduced.

In this example, the stator core pack 300 is a cobalt iron alloy stator core. Cobalt iron alloys have higher flux density capability than other materials that may be used in stator core packs, such as silicon iron lamination materials. Higher flux density capability may enable the stator core to have a smaller volume than a corresponding stator core of a lower flux density capable material, and therefore a lighter weight.

The flux density capability of cobalt iron alloys reduces under compressive stress. Therefore, reducing the compressive stress on the stator core pack 300 may enable the stator core to have a higher flux density capability. By using a sleeve 200, it may be possible to reduce compressive stress of the stator core pack 300. Therefore, use of a sleeve 200 may enable the use of cobalt iron alloys in the stator core pack 300.

Figure 6:
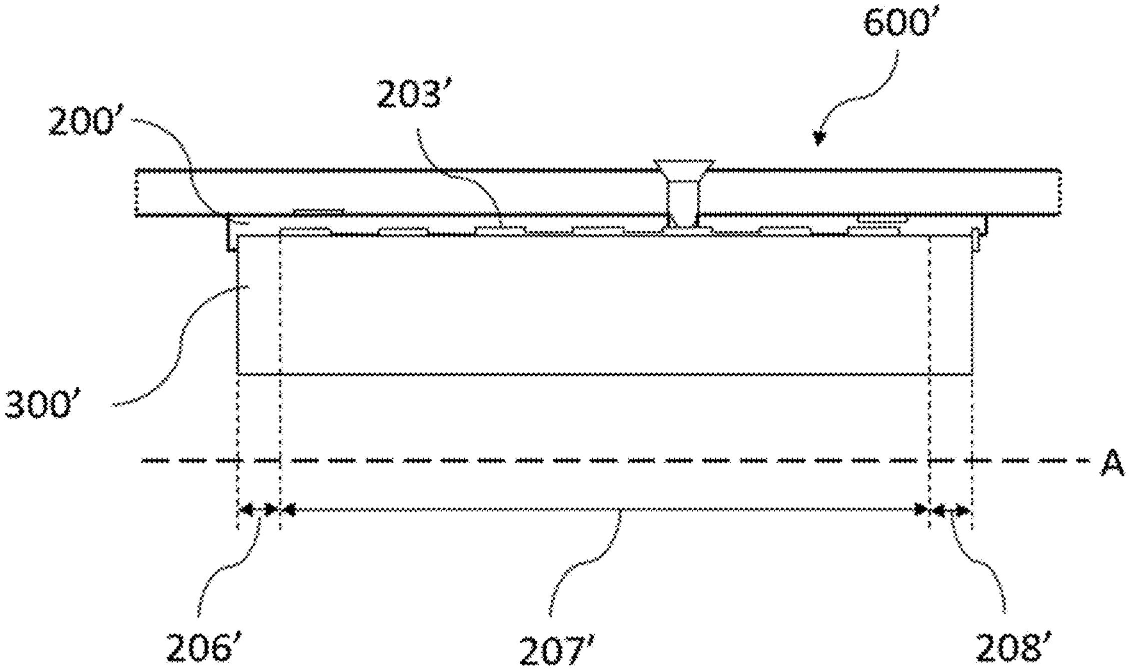
FIG. 6 shows schematically a variant of the electric motor of FIG. 4.

FIG. 6 shows a variant 600' of the electric motor shown in FIG. 4. In this example, a plurality of inner projections 203', which extend circumferentially around the inner surface of the sleeve 200', are provided along the second portion 207' of the sleeve 200'. This may help to reduce the compressive stress over the first 206' and third 208' portions of the sleeve 200' (e.g. compared to an example in which the sleeve is spaced from the stator core pack along the length of the second portion), as the compressive stress may be more evenly distributed over the total length of the sleeve 200'. Therefore, this may lead to a corresponding reduction in the peak compressive stress on the stator core pack 300'.

In some examples, the sleeve 200' remains in contact with the stator core pack 300' over the entire length of the stator core pack 300'. There is, however, a reduced shrink fit between the stator core pack 300' and the sleeve 200' at the plurality of inner projections 203'. In some examples, the sleeve 200' is spaced from the stator core pack 300' between the inner projections 203'.

Spacing the sleeve from the stator core pack (along the second portion) may not provide as good a thermal pathway for cooling of the stator core pack via the sleeve. However, it may result in a larger reduction in compressive stress on the stator core pack.

In some examples, the clearance (along the second portion) between the stator core pack 300; 300' and the sleeve 200; 200' is approximately 0.25 mm. This may provide sufficient clearance to reduce compressive stress, while also providing a reasonable heat path for cooling of the stator core pack via the sleeve 200.

In some examples, the stator windings of the stator core pack may be oil cooled by flooding the stator core pack with oil. In these examples, additional external cooling may not be required and therefore the sleeve may be spaced from the stator core pack (along the second portion) without substantially compromising the external cooling heat path.

Figure 7:
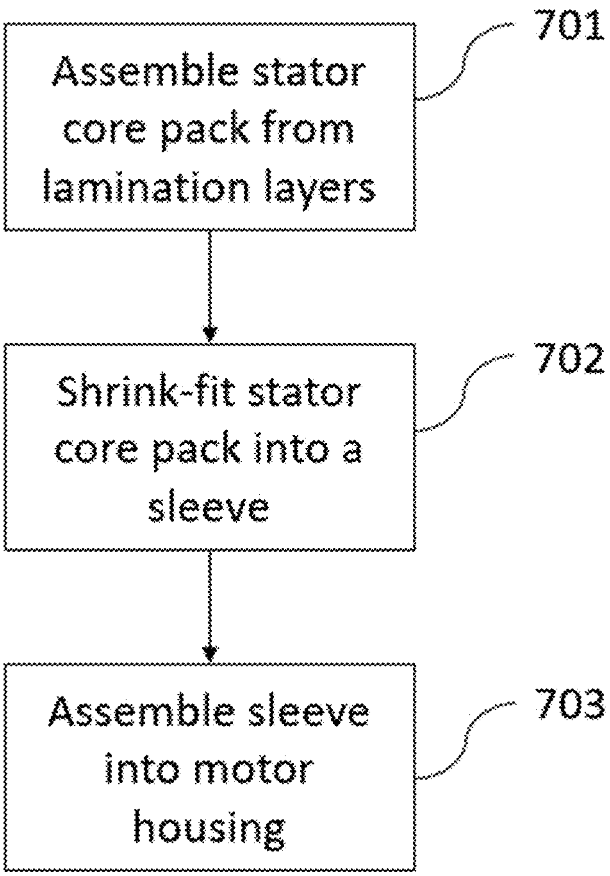
FIG. 7 shows a method of assembling an electric motor, such as the electric motors shown in FIGS. 4 and 6.

Referring to FIG. 7, a method of assembling an electric motor 600 is provided. This method may be used to assemble an electric motor 600 such as the electric motor 600 of FIG. 4.

In this example, the method comprises a first step 701 of assembling a stator core pack 300 from lamination layers 100.

In this example, the lamination layers 100 are three-piece lamination layers comprising three lamination layer pieces 101, 102, 103, as shown in FIG. 1. In this example, the stator core pack 300 is a three-piece stator core pack comprising three stator core pack pieces 301, 302, 303, as shown in FIG. 3.

In this example, the method comprises a second step 702 of shrink-fitting the stator core pack 300 into a sleeve 200. In this example, the second step 702 comprises locating anti-rotation protrusions 305 of the stator core pack 300 into anti-rotation grooves 204 of the sleeve. In this example, the second step 702 comprises fitting a retention ring 308 into a retention ring groove 211 of the sleeve 200.

In this example, the method comprises a third step 703 of assembling the sleeve 200 into a motor housing 500. In this example, the third step 703 comprises fitting a tolerance ring into a motor housing tolerance ring groove 501. In the example, the third step 703 comprises fitting a tolerance ring into an sleeve tolerance ring groove 205 of the sleeve 200. In this example, the third step 703 comprises securing the sleeve 200 within the motor housing 500 using radial bolts 502 which locate into anti-rotation holes 202. In this example, the third step 703 comprises partially inserting a radial bolt 502 into an alignment groove 201 of the sleeve 200 during assembly. This helps to align and position the anti-rotation holes 202 relative to the motor housing 500.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A stator assembly for an electric motor, the stator assembly comprising:

a stator core pack; and a sleeve for the stator core pack;

wherein the sleeve comprises:

a first portion proximal to a first end of the sleeve; and a second portion adjacent to the first portion of the sleeve;

wherein the stator core pack is at least partially within the sleeve;

wherein the first portion of the sleeve is in contact with the stator core pack;

wherein the sleeve is arranged to apply a compressive stress to the stator core pack; and wherein the stator assembly is arranged such that the compressive stress applied by the first portion of the sleeve to the stator core pack is greater than the compressive stress applied by the second portion of the sleeve to the stator core pack.

2. The stator assembly as claimed in claim 1, wherein at least part of the second portion of the sleeve is spaced from the stator core pack.

3. The stator assembly as claimed in claim 1, wherein the second portion of the sleeve is in contact with the stator core pack.

4. The stator assembly as claimed in claim 1, wherein the sleeve comprises a third portion proximal to a second end of the sleeve;

wherein the second portion is between the first portion and the third portion;

wherein the third portion of the sleeve is in contact with the stator core pack; and wherein the stator assembly is arranged such that the compressive stress applied by the third portion of the sleeve to the stator core pack is greater than the compressive stress applied by the second portion of the sleeve to the stator core pack.

5. The stator assembly as claimed in claim 1, wherein at least part of an inner surface of the second portion of the sleeve is radially outward of the first portion of the sleeve.

6. The stator assembly as claimed in claim 1, wherein the sleeve comprises an end protrusion;

wherein the end protrusion extends radially inwardly from an inner surface of the sleeve;

wherein the end protrusion is proximal to the first end of the sleeve; and wherein the end protrusion is arranged to at least partially retain the stator core pack axially relative to the sleeve.

7. The stator assembly as claimed in claim 1, wherein the stator assembly comprises a retention ring;

wherein the retention ring is proximal to a second end of the sleeve;

wherein the retention ring is arranged to at least partially axially retain the stator core pack relative to the sleeve; and optionally, wherein the sleeve comprises a retention ring groove;

wherein the retention ring groove is proximal to the second end of the sleeve;

wherein the retention ring groove extends at least partially around a circumference of an inner surface of the sleeve; and wherein the retention ring is located in the retention ring groove.

8. The stator assembly as claimed in claim 1, wherein the sleeve comprises at least one anti-rotation groove;

wherein the anti-rotation groove extends axially from an end of the sleeve;

wherein the stator core pack comprises at least one anti-rotation protrusion; and wherein the at least one anti-rotation protrusion is located in the at least one anti-rotation groove; or wherein the stator core pack comprises at least one anti-rotation groove;

wherein the anti-rotation groove extends axially from an end of the stator core pack;

wherein the sleeve comprises at least one anti-rotation protrusion; and wherein the at least one anti-rotation protrusion is located in the at least one anti-rotation groove.

9. The stator assembly as claimed in claim 1, wherein the sleeve comprises at least one anti-rotation groove;

wherein the anti-rotation groove extends axially from an end of the sleeve;

wherein the stator core pack comprises at least one anti-rotation protrusion; and wherein the at least one anti-rotation protrusion is located in the at least one anti-rotation groove.

10. The stator assembly as claimed in claim 1, wherein the stator core pack comprises at least one anti-rotation groove;

wherein the anti-rotation groove extends axially from an end of the stator core pack;

wherein the sleeve comprises at least one anti-rotation protrusion; and wherein the at least one anti-rotation protrusion is located in the at least one anti-rotation groove.

11. The stator assembly as claimed in claim 1, wherein the stator core pack comprises a cobalt iron alloy; and wherein the stator core pack is a laminated stator core pack;

wherein the laminated stator core pack comprises a plurality of lamination layers;

wherein the stator core pack comprises a plurality of stator core pack pieces; and wherein each stator core pack piece forms a circumferential segment of the stator core pack.

12. An electric motor comprising:

the stator assembly as claimed in claim 1; and a motor housing;

wherein the stator assembly is retained within the motor housing.

13. An electric motor as claimed in claim 12, wherein at least a portion of the motor housing is radially spaced from the stator assembly.

14. The electric motor as claimed in claim 12, wherein the electric motor comprises a first tolerance ring; and wherein the sleeve comprises a sleeve tolerance ring groove;

wherein the sleeve tolerance ring groove is proximal to an end of the sleeve;

wherein the sleeve tolerance ring groove extends at least partially around a circumference of an outer surface of the sleeve; and wherein the first tolerance ring is located in the sleeve tolerance ring groove.

15. The electric motor as claimed in claim 12, wherein the electric motor comprises a second tolerance ring; and wherein the motor housing comprises a motor housing tolerance ring groove;

wherein the motor housing tolerance ring groove is proximal to an end of the sleeve;

wherein the motor housing tolerance ring groove extends at least partially around a circumference of an inner surface of the motor housing; and wherein the second tolerance ring is located in the motor housing tolerance ring groove.

16. The electric motor as claimed in claim 12, wherein the sleeve comprises at least one anti-rotation hole;

wherein the anti-rotation hole extends radially inwardly from an outer surface of the sleeve;

wherein the electric motor comprises at least one radial bolt located in the at least one anti-rotation hole; and wherein the at least one radial bolt is arranged to retain the stator assembly relative to the motor housing.

17. The electric motor as claimed in claim 16, wherein the sleeve comprises at least one alignment groove;

wherein the alignment groove extends axially from an end of the sleeve; and one of the at least one anti-rotation holes is located at the axial end of the alignment groove furthest from the end of the sleeve from which the alignment groove extends.

18. A method of assembling a stator assembly comprising:

shrink fitting a sleeve onto a stator core pack to form the stator assembly;

wherein the sleeve comprises:

a first portion proximal to a first end of the sleeve; and a second portion adjacent to the first portion of the sleeve;

wherein the stator core pack is at least partially within the sleeve;

wherein the first portion of the sleeve is in contact with the stator core pack;

wherein shrink fitting the sleeve onto the stator core pack includes arranged the sleeve to apply a compressive stress to the stator core pack; and wherein the stator assembly is arranged such that a compressive stress applied by the first portion of the sleeve to the stator core pack is greater than a compressive stress applied by the second portion of the sleeve to the stator core pack.

* * * * *